T. VILLAMOR.
MACHINE FOR SCRAPING VEGETABLE STALKS.
APPLICATION FILED AUG. 6, 1918.
1,314,100.
Patented Aug. 26, 1919.
4 SHEETS—SHEET 1.
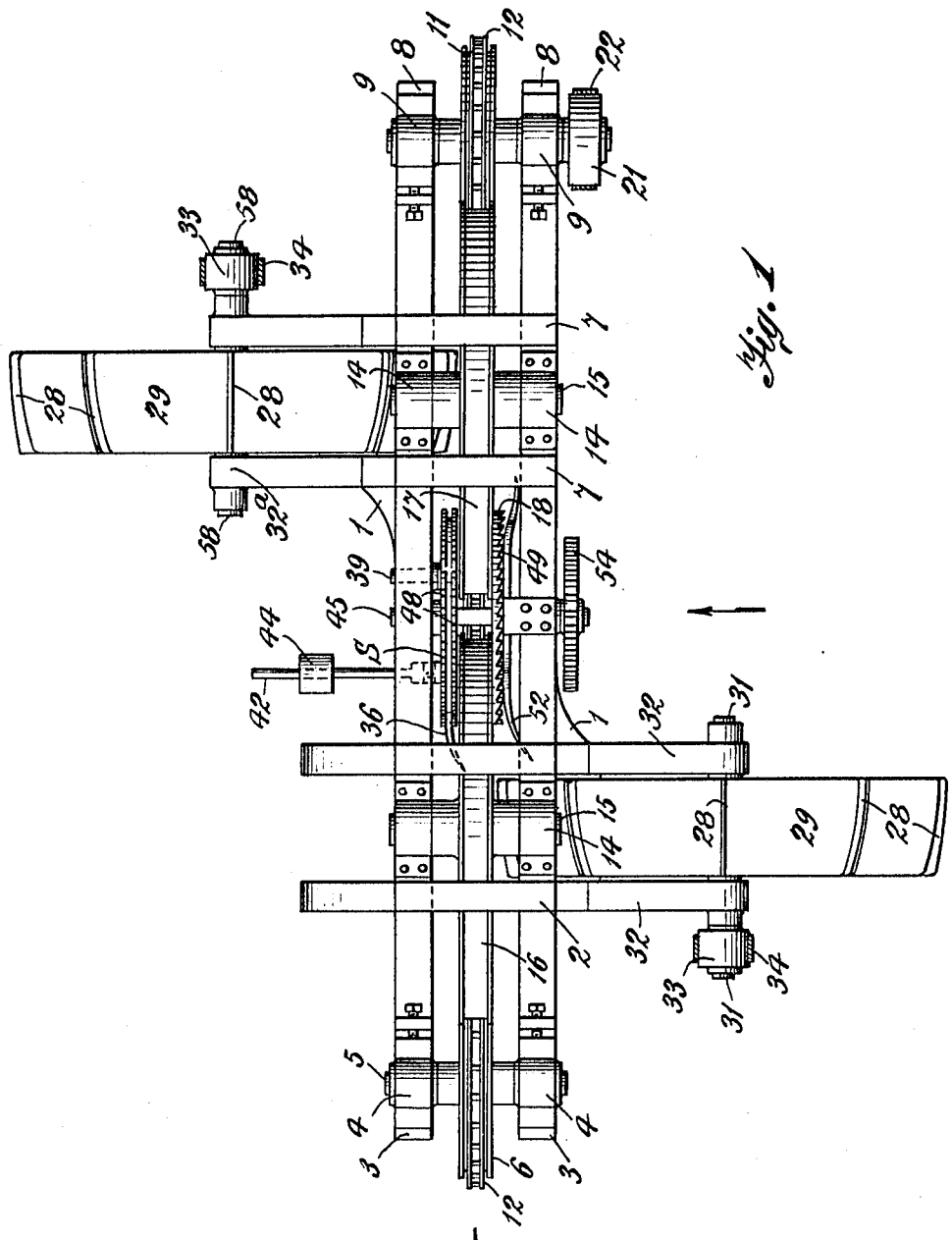
INVENTOR
ATTORNEY

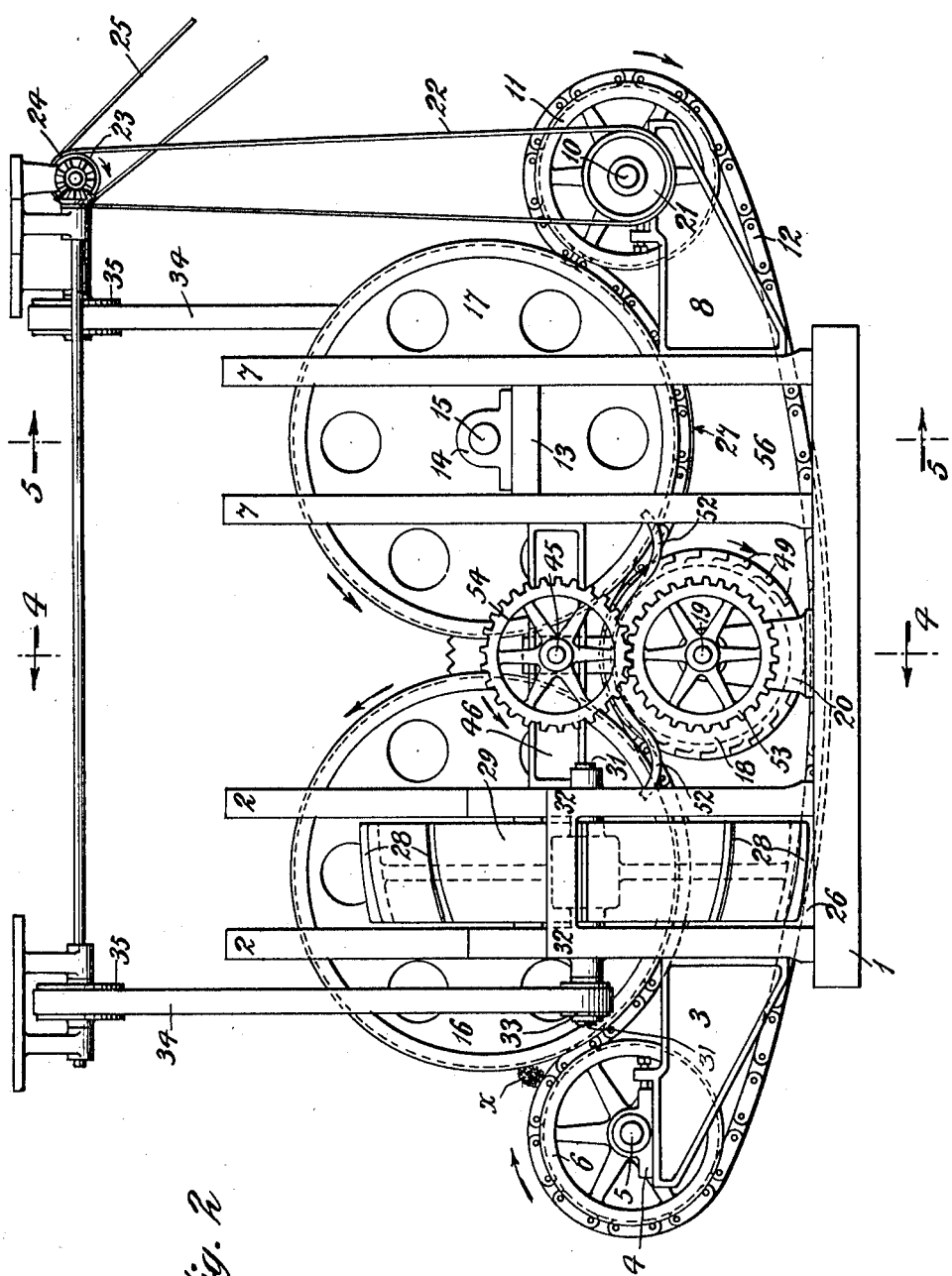

T. VILLAMOR.
MACHINE FOR SCRAPING VEGETABLE STALKS.
APPLICATION FILED AUG. 6, 1918.
1,314,100.
Patented Aug. 26, 1919.
4 SHEETS—SHEET 3.
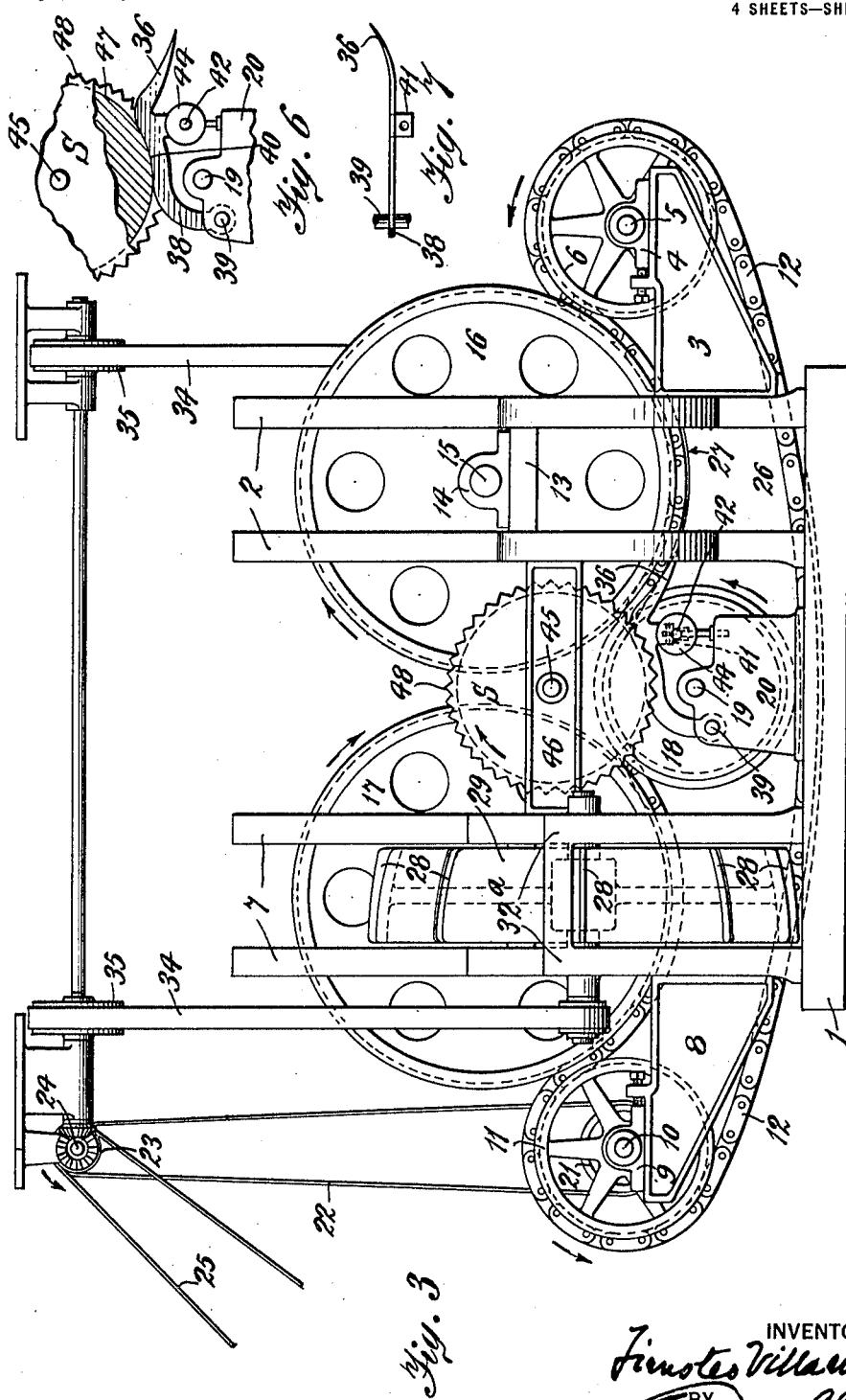
INVENTOR
Timoteo Villamor
BY
Edward S. Beach
ATTORNEY T. VILLAMOR.
MACHINE FOR SCRAPING VEGETABLE STALKS.
APPLICATION FILED AUG. 6, 1918.
1,314,100.
Patented Aug. 26, 1919.
4 SHEETS—SHEET 4.
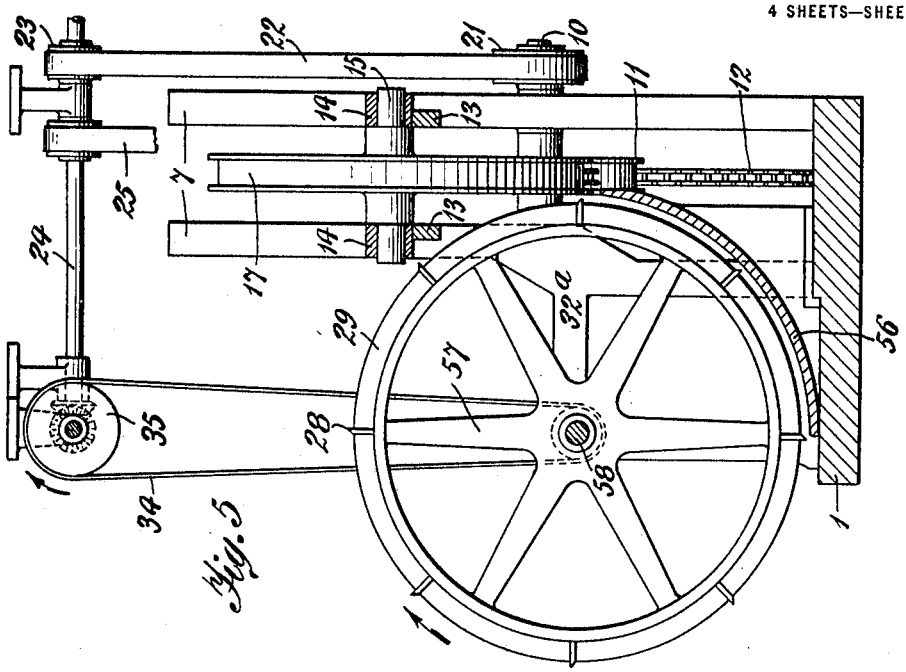
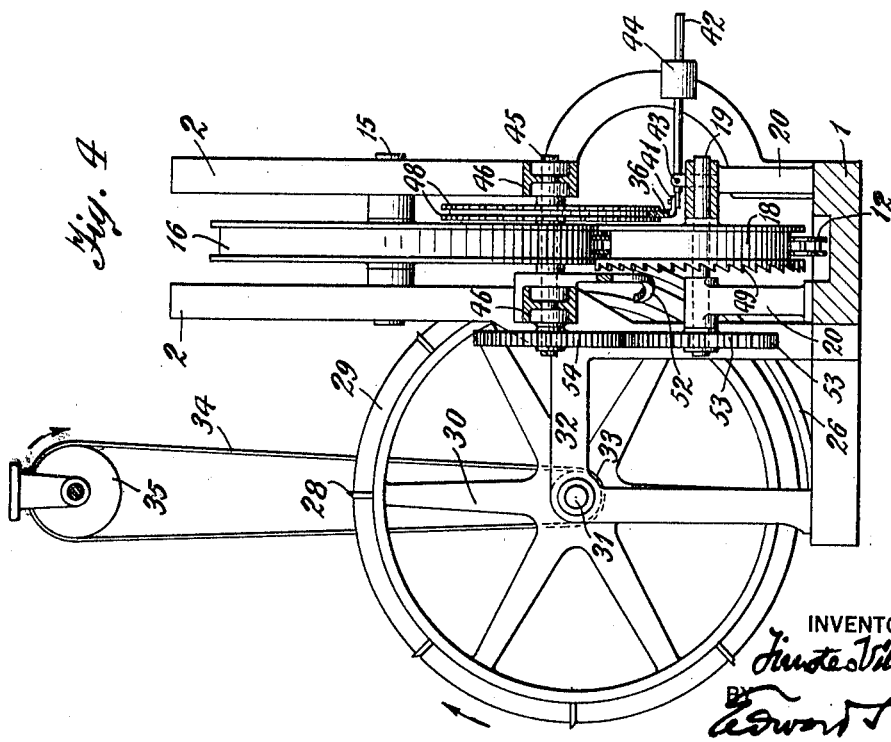
INVENTOR
ATTORNEY

UNITED STATES PATENT OFFICE.

TIMOTEO VILLAMOR, OF MERIDA, MEXICO.

MACHINE FOR SCRAPING VEGETABLE-STALKS.

1,314,100. Specification of Letters Patent. Patented Aug. 26, 1919.

Application filed August 6, 1918. Serial No. 248,532.

*To all whom it may concern:*

Be it known that I, TIMOTEO VILLAMOR, a citizen of Mexico, residing in Merida, Yucatan, Mexico, have invented certain new and useful Improvements in a Machine for Scraping Vegetable-Stalks, of which the following is a specification.

This invention relates to machines for scraping vegetable stalks preparatory for manufacturing operations. My improved machine is especially useful in removing from vegetable fiber the pulpy portions and sap so as to leave the fiber in a proper condition for sale or use as referred to in my United States Patent 362,683 of May 10, 1887; and it is especially useful in the production of fiber from the leaves of such plants as the *Agave Americana* as referred to in United States Patent 482,205 of September 6, 1892. One of the commercial products obtained by the use of my machines is sisal or hemp obtained from the herb *Cannabis sativa* of the nettle family (*Urtacaceæ*). Its object is to increase speed and reduce cost of the scraping by automatically shifting a bunch of sidewise traveling stalks from one set of scraping devices, which act on about one-half of the length of the bunch, while the bunch is held near its mid-length portion by conveying mechanism, endwise between a second set of scraping devices which scrape the remaining length of the bunch that was not scraped by the first acting scraping devices.

In the accompanying drawings forming a part hereof:

Figure 1 is a top plan view,

Fig. 2 is a side elevation looking in the direction of the arrow in Fig. 1 of my new machine, Fig. 3 is an elevation of a side opposite the side shown in Fig. 2, Figs. 4 and 5 are respectively vertical sections through the machine at line 4—4 and line 5—5 of Fig. 1, Fig. 6 is a sectional elevational view of the bunch gripping mechanism forming a part of the machine, and Fig. 7 is a top edge view of the pivoted gripping finger which forms a part of the gripping mechanism shown in Fig. 6.

In Figs. 1 and 2 of the drawings, I show a bunch $x$ of stalks at the front end of the machine. From the front end portion of its base 1, four quadrangularly disposed posts 2 extend upwardly. Each front end post 2 has a forwardly projecting bracket 3 carrying a journal box 4, in which a transverse shaft 5 carrying a chain wheel 6 is journaled. From the rear end portion of the base, four quadrangularly disposed posts 7 rise, each of the two rear posts being provided with a bracket 8 carrying journal boxes 9, in which a transverse shaft 10 is mounted, this shaft supporting a chain wheel 11 which is in the same plane as the chain wheel 6. The two chain wheels are peripherally grooved and carry an endless conveyer chain 12, the upper and under runs of which travel between the posts 2 and 7 rising from either side of the base. At each side of the machine the two side posts 2 are connected by horizontal tie bars 13, one opposite the other, and in opposite journal boxes 14 supported by these tie bars, a transverse shaft 15 is mounted and has fixed to it a chain wheel 16, the periphery of which is directly opposed to the periphery of the chain wheel 6. The two posts 7 at each side of the machine are similarly connected by tie bars 13, each supporting a journal box 14 for a transverse shaft 15 in which is fixed a rear peripheral grooved chain wheel 17, the periphery of which is directly opposed to the periphery of the chain wheel 11, the two chain wheels 16 and 17 being of larger diameter than the chain wheels 6 and 11, in order to give sufficient extent of travel for the bunch of stalks being scraped during the scraping actions. The endless chain 12 at the end of its upper run lies in the peripheral grooves of the front chain wheel 6 and of the back chain wheel 11, and between the chain wheels 6 and 11 is engaged on its upper side by the channel walls of the two larger chain wheels 16 and 17. The upper run of the chain also travels from the upper periphery over an intermediate peripheral grooved chain wheel 18, which is fixed on a transverse shaft 19, the ends of which are mounted in the upstanding side brackets 20 of the base. The upper run of the chain from the chain wheel 6 to the chain wheel 11 constitutes its functional portion, and the bracket shaft 10 is provided with a pulley 21 from which a driving belt 22 extends to a pulley 23 on an overhead shaft 24, which in turn is driven by a belt 25 running from a motor not shown. A bunch $x$ of stalks is placed sidewise into the angular space as indicated in Fig. 3, between the opposed outer surface of the upper run of the chain and of the periphery of the upper chain wheel 16, and as the chain wheels rotate in the direction of the arrows shown in Fig. 3, this bunch of stalks is carried sidewise between the periphery of the upper chain wheel 16 and the upper surface of the upper run of the chain. Rising from one edge of the base between the two adjacent posts 2 at that edge there is (Fig. 5) a stationary scraper plate 26 that is concave on its lateral outward surface. This scraper plate 26 has its upper edge made concave at 27, the concavity being the arc of a circle that has a diameter exceeding the diameter of the chain wheel 16; such concave upper edge 27 is opposed to the periphery of the chain wheel 16 and spaced apart therefrom. When that end portion of the bunch of stalks that projects outwardly from between the chain and the wheel 16 is carried rearwardly in overhanging relation to the outer concave side of the scraper plate 26, the bunch of stalks is progressively scraped during such travel by the transverse scrapers 28 spaced apart around the rim 29 of a scraper wheel 30, which is fixed on a shaft 31 that is mounted at right angles to the shafts above mentioned in parallel outboard risers 32 from the base. This scraper wheel shaft 31 (Figs. 4 and 2) is provided with a pulley 33, from which a belt 34 goes to a driven pulley 35; and the transverse scrapers 28 of the wheel 30 progressively scrape that end of the bunch of stalks which, by the scraping wheel 30, is scraped and bent down into the space between the opposed peripheral portion of the wheel and the concave face of the scraper plate 26. While the bunch of stalks is being scraped by the scraping wheel 30, it is also being carried rearwardly toward the intermediate chain wheel 18 and will, of course, emerge from the grip of the chain and the wheel 16 when and as the chain leaves the periphery of wheel 16 to travel rearwardly over the upper peripheral portion of the wheel 18. At this juncture, the stalk, which has up to this time been gripped, is approaching a point at which it can be moved endwise, and for this purpose is carried over the downwardly and forwardly curving, and also laterally inwardly curving free end 36 (Figs. 6 and 7) of the gripper finger 38, the butt end of which is pivoted at 39 in one of the upstanding brackets 20, the pivot being rearward of the shaft 19. Rearwardly of its front free end 36, the upper edge of the gripper finger is concave at 40 to conform to the curvature of the under periphery of the bunch shifting wheel S. The gripper finger is provided with a lug 41 between its pivoted and free ends, this lug projecting laterally outward, and being engaged by the inward end (Fig. 4) of weighted lever 42, which is pivoted at 43 to a portion of the machine frame, and is provided with a slidable counterweight 44 at its outward end. The shifting wheel S is carried by a transverse shaft 45, supported at each end by a longitudinally extending tie bar 46, that at each side of the machine connects an upright 2 to an upright 7. The shifting wheel has a peripheral groove 47, each peripheral side flange of the groove being notched as at 48. The curved edge of the gripper finger is opposed to the bottom of the groove 47. As the bunch of stalks on its unscraped end rides up over the free end 36 of the gripper finger, the teeth 48 of the positively driven shifting wheel engage the bunch, which is thereby fed rearwardly, passing between the opposed edges of the shifting wheel and gripper finger, and being bent down over the outward side of the gripper finger 38.

The transverse shaft 45 passes between the opposed peripheries of the chain wheels 16 and 17, and above the upper periphery of the intermediate chain wheel 18. The diameter of the shifting wheel S is such that in elevational view it overlaps the laterally opposed sides of the three chain wheels 16, 17 and 18. Now looking at the other side of the machine, it will be noted that the intermediate chain wheel 18 has, on its peripheral margin that is farthest from the side of the shifting wheel S, a series of laterally projecting teeth 49 (Figs. 4 and 2). On this side of the machine, there is a lengthwise extending stalk depressor frame 50, which is concavo-convex between its ends, and fixed at 51 midway between its ends to a tie bar 46. At its front end, this depressor bar curves upwardly and also outwardly as at 52, and is spaced apart from the opposed side margin of the chain wheel 16.

As previously stated, the bunch of stalks is assumed to have passed between the shifting wheel S and the gripper finger 38. At the same time, the other end of the bunch of stalks will have passed under the front end of the stalk depressor, and at this time the laterally projecting gripper teeth 49 of the intermediate chain wheel 18 will engage the stalks projecting on this side of the wheel 18 between the periphery of such wheel and the under side of the depressor bar, with the result that the stalk bunch is carried rearwardly by the intermediate wheel and, its teeth coöperating with the depressor bar, is simultaneously moved endwise by reason of its engagement with the teeth 48 of the shifting wheel and the overlapping relation of the periphery thereof to the upper periphery of the intermediate chain wheel, whereby the bunch of stalks is bent downwardly and pulled endwise over the upper peripheral portion of the intermediate wheel 18. The intermediate chain wheel 18 and the shifting wheel S are positively driven, the shifting wheel being rotated by the travel of the chain 12, and its shaft 19 having a spur gear 53 which is in constant mesh with the spur gear 54 on the end of shaft 45.

After the endwise shifted bunch of stalks passes rearwardly from between the shifting wheel S and gripper finger 38, and the depressor bar 52 and the marginal teeth 49 of the intermediate chain wheel 18, the bunch passes between the chain 12 and the rear upper chain wheel 18 and is carried rearwardly and outwardly between the chain and the upper rear chain wheel 17 over the upper concave edge 55 of the rear scraper plate 56, which is identical with the scraper plate 26, except that its concave side is toward the side of the machine opposite the concave side of the scraper plate 26; and for this rear scraper plate, a rear scraper wheel 57 (Fig. 5) is provided, being mounted on a shaft 58 in the rearward outboard bearings 32ª which project in a direction opposite to the direction of the projection of the front outboard bearings 32.

The two scraper wheels and scraper plates are identical in construction, and the scraper wheels (Fig. 1) are each of continuously varying diameter in diametric cross section, the largest diameter being at the rear side and the smallest diameter at the front side, and the transverse scrapers 28 with which their rims are provided, curving from the back side convergingly toward the front side wheel.

Because of the endwise shifting of the bunch of stalks, the portion thereof that was prevented from being scraped during the first scraping action is scraped during the second scraping action, so that when the stalks are ejected they will have been wholly scraped from end to end.

The shafts 31 and 58 of the scraping wheels are each provided with pulleys 33 and driving belts 34.

What I claim is:

The combination in a machine for scraping vegetable fibrous material of a carrying mechanism for the material; a plurality of scraping mechanisms; and a mechanism for shifting the material endwise during its travel and after it has been scraped by one scraping mechanism, into another position in the carrying mechanism to have its unscraped portion wholly scraped by a succeeding scraping mechanism; the carrying mechanism comprising three alined under chain-engaging wheels, an endless chain, and a pair of alined upper chain-engaging wheels located to coöperate with said chain; and said succeeding scraping mechanism comprising a revoluble wheel having an axis at an angle to the alined chain-engaging wheels and positioned at one side of such wheels; and the mechanism for shifting the material endwise comprising a shifter wheel and gripper finger concaved to conform to the curvature of the periphery of the shifting wheel.

In testimony whereof I have hereunto set my hand this 19th day of July, 1918.

TIMOTEO VILLAMOR.

Copies of this patent may be obtained for five cents each, by addressing the "Commissioner of Patents, Washington, D. C."